US012661212B2

(12) United States Patent
  Marcella

(10) Patent No.: US 12,661,212 B2
(45) Date of Patent: Jun. 23, 2026

(54) ELECTRONIC FLOSSING DEVICE COMPRISING DISPOSABLE FLOSSING CARTRIDGE

(71) Applicant: Mary C. Marcella, Raleigh, NC (US)

(72) Inventor: Mary C. Marcella, Raleigh, NC (US)

( * ) Notice: Subject to any disclaimer, the term of this patent is extended or adjusted under 35 U.S.C. 154(b) by 141 days.

(21) Appl. No.: 18/741,065

(22) Filed: Jun. 12, 2024

(65) Prior Publication Data

US 2025/0381018 A1 Dec. 18, 2025

(51) Int. Cl.
  *A61C 15/04* (2006.01)
(52) U.S. Cl.
  CPC ................................. *A61C 15/047* (2013.01)
(58) Field of Classification Search
  CPC ... A61C 15/047; A61C 15/043; A61C 15/045; A61C 15/046
  USPC ......................................................... 132/322
  See application file for complete search history.

(56) References Cited

U.S. PATENT DOCUMENTS

| | | | | | |
|---|---|---|---|---|---|
| 3,759,274 | A | * | 9/1973 | Warner | A61C 15/047 |
| | | | | | 132/325 |
| 4,245,658 | A | * | 1/1981 | Lecouturier | A61C 15/047 |
| | | | | | 132/322 |
| 5,016,660 | A | * | 5/1991 | Boggs | A61C 15/047 |
| | | | | | 132/322 |
| 5,186,191 | A | * | 2/1993 | Loubier | A61C 15/047 |
| | | | | | 132/324 |
| 5,343,883 | A | * | 9/1994 | Murayama | A61C 17/20 |
| | | | | | 433/118 |
| 5,560,378 | A | * | 10/1996 | Tiphonnet | A61C 15/046 |
| | | | | | 132/327 |
| 5,636,988 | A | * | 6/1997 | Murayama | A61C 17/20 |
| | | | | | 433/119 |
| 5,678,578 | A | * | 10/1997 | Kossak | A61C 17/16 |
| | | | | | 132/325 |
| 5,769,102 | A | * | 6/1998 | Zebuhr | A61C 15/047 |
| | | | | | 132/327 |
| 5,816,271 | A | * | 10/1998 | Urso | A61C 15/047 |
| | | | | | 132/325 |
| 6,092,536 | A | * | 7/2000 | Owens | A61C 15/046 |
| | | | | | 132/324 |
| 12,521,215 | B1 | * | 1/2026 | Urso | A61C 15/047 |
| 2008/0289648 | A1 | * | 11/2008 | Liu | A61C 15/046 |
| | | | | | 132/325 |
| 2010/0139689 | A1 | * | 6/2010 | Couch | A61C 15/047 |
| | | | | | 132/325 |
| 2021/0259816 | A1 | * | 8/2021 | Bushman | A61C 15/046 |
| 2021/0401555 | A1 | * | 12/2021 | Chen | A61C 15/046 |
| 2023/0270531 | A1 | * | 8/2023 | Bushman | A61C 15/046 |
| | | | | | 132/323 |

* cited by examiner

*Primary Examiner* — Edelmira Bosques
*Assistant Examiner* — Holly T. To
(74) *Attorney, Agent, or Firm* — The Rapacke Law Group, P.A.

(57) ABSTRACT

A dental flossing device that allows for simplifying the process of flossing by providing a removable flossing cartridge that includes a distribution reel containing clean, unused, flossing material, and a take-up reel which will eventually contain used flossing material, such that a clean flossing material may be used to clean teeth while preventing used flossing material from being repeatedly used. In addition, the collection of the used flossing material within the cartridge prevents the user from coming into contact with bacteria that may be collected on the used flossing material.

16 Claims, 5 Drawing Sheets

200

330

332b

350b

125

122

150b

121

150a

350a

203

332a

360

ELECTRONIC FLOSSING DEVICE COMPRISING DISPOSABLE FLOSSING CARTRIDGE

TECHNICAL FIELD

The embodiments presented relate to dental flossing devices and, in particular, a flossing device containing a removable cartridge containing flossing material.

BACKGROUND

Proper dental care has long been known to include a flossing process, wherein a flossing material is inserted between a user's or patient's teeth to remove particles and bacteria that are trapped between the teeth. Flossing generally requires the flossing material to be wrapped around a finger on each hand, held taut, and then pushed between the teeth.

Alternative methods have been developed that overcome the issues and the appearance of the conventional flossing technique. For example, water flossers have been created to remove the need for wrapping string floss around the fingers and these devices act by pushing water between the teeth to wash away particles and bacteria. However, while the ADA (American Dental Association) does endorse water flossering, they still recommend daily string flossing for optimal dental health. There are also alternative flossing methods that use string and alleviate the need for wrapping the floss around the fingers by using holders for the string but these methods do not allow for the user to have a fresh piece of floss for each interdental space. These devices have tines to hold a stationary piece of floss, much like a floss pick, and have a motorized vibration function but leave the user with the same problem incurred with floss picks: the floss being used is dirty after it is used on the first interdental space. There have also been motorized flossers developed that wrap floss around tines and include a distribution tool and a take-up spool but they only work to the extent that they have prefilled floss in them. Once the small amount of pre-filled floss has been used, the user is either left to throw the entire mechanism away or must manually wrap floss around the tines and reattach it to a take-up spool and then attempt to establish the correct level of tautness needed to be able to floss adequately. In addition, there are mechanisms that allow the user to cut the used floss off and pull fresh floss along manually or electronically. This method, however, both requires the user to touch and pull the dirty, used floss as well as leaves the user responsible to manually retain the correct level of tautness to continue flossing. Additionally, this method is not able to hold tautness as the floss is pulled out from the interdental spaces because the same upward pulling action that is used to pull the floss out of each interdental space is the same upward pulling action that must be used to pull the floss from the tines in order for each advancement of the floss to occur. Therefore, the floss in these mechanisms can be pushed between the teeth but when the user pulls the floss out of the interdental space, the floss detaches from the tines that are supposed to hold it taut. There is currently no flossing device that allows the user continued ease of use, reel after reel of used floss, with fresh floss each time and no requirement of the user having to manually wrap, attach, cut, and/or manually reestablish tautness in the flossing material.

Therefore, the current mechanisms, which either do not allow the user to have fresh floss each time or that require the user to manually wrap and attach floss, or find the correct level of tautness manually, are no better or easier than the conventional method of wrapping the floss around the fingers. In addition, these methods often require the user to touch the used floss, which contains the bacteria that has been extracted from between the teeth. In addition, the same piece of flossing material is generally used for the whole flossing process. Thus, the interdental spaces are not being cleaned properly and the user's efforts have merely resulted in the movement of bacteria from one area of the mouth to others as these flossing methods push bacteria from one interdental space down into the gumline area of another interdental space.

Hence, there is a need for a flossing device that overcomes the issues concerning flossing while make flossing easier and more convenient so that a wider array of users can enjoy the benefits of improved health that regular flossing provides.

RELATED ART

The following patents or publications are in the same or similar field of technology as the embodiments of the disclosure presented herein.

U.S. Pat. No. 5,678,578 discloses a dental flossing device that is characterized by a flossing circuit comprising a floss supply spool and a take-up spool mounted to a housing containing a gear train assembly adapted to rotate the take-up spool in a winding direction. The floss feeds from the supply spool along a pair of prongs forming a forked extension of the handle and is stretched across the forked prongs and appropriately tensioned to be inserted into a user's mouth for flossing. To maintain hygiene, the take-up spool is mounted outside the housing. In a manually operated embodiment, a manually depressible trigger projecting from the housing is operable to rotate the take-up spool with reverse rotation thereof being prevented with a ratchet mechanism. Release of the manually depressible trigger reversely rotates the supply spool through a short arcuate interval to remove slack and then locks the supply spool against unwinding rotation through gear teeth. In a preferred manually operated embodiment, first and second ratchet mechanisms are utilized to prevent reverse rotation of the supply and take-up spools while sufficiently tensioning the floss circuit. In other embodiments, the housing may be formed for mounting the flossing device as an attachment to a hand-held motorized toothbrush handle equipped with a motor from which projects and output shaft. Depending upon the model, the gear train assembly may be modified to convert longitudinal stroking motion of the shaft or oscillatory motion into uni-directional rotating motion to rotate the take-up spool in one direction only.

U.S. Pat. No. 9,510,921 discloses a high-speed automatic dental flosser that includes a detachably connected flossing attachment having a pair of flossing tines and for supporting a movable floss span to floss teeth, a floss supply spool for continuously supplying fresh floss spans, and a floss take-up spool includes a built-in floss gripper. A power driver includes a dual-shaft geared motor having an anterior drive shaft drivingly connectable to the take-up spool and a posterior drive shaft for drivingly rotating an eccentrically supported weight to oscillate the floss span. An electric momentary switch actuates the motor energized by a power cell. A built-in floss-cutter is provided for cutting off used floss. An alternative flossing attachment includes an alternative floss gripper built into a take-up spool. Additional flossing attachments and are included.

U.S. Patent Application Publication No. 2005/0252520A1 discloses a flossing device that has an internal floss feed in which floss is advanced from a storage chamber in the handle of the device, through feed gears, to a pair of spaced apart tines. The tines are configured to fit into the mouth such that the floss may be easily worked between the teeth. Spent floss is returned through the return gears, the return gears having a greater diameter than the feed gear, thus ensuring the floss remains taut between the tines, to an integral cutter whereby it may be cut off and discarded. In a second embodiment, the flossing head has a vibratory device to aid in the flossing action.

U.S. Patent Application Publication No. 2011/0041870A1 discloses a dental flosser that includes a housing having a pair of arms spaced apart to define a gap therebetween, a supply core rotatably coupled to the body, a wind-up spool rotatably coupled to the body for rotation in a single direction with respect to the body, a pawl movable between an engaged position that restricts rotation of the supply core with respect to the body assembly, and a disengaged position that allows the supply core to rotate with respect to the body. The flosser also includes an actuator operatively coupled to the pawl and the take-up spool. The actuator is operable to move the pawl from the engaged position to the disengaged position and to rotate the take-up spool in the first direction.

However, these and other devices are not configured to maintain and reestablish a desired level of tautness of floss between tines.

SUMMARY OF THE INVENTION

The embodiments disclose a flossing device suitable for improving the flossing experience.

A flossing device is disclosed that provides for the dispensing of a flossing material that does not require the user to touch or come into contact with the used flossing material.

A flossing device is disclosed that includes a dispensing reel of flossing material and a collection reel that collects used flossing material wherein the user need not touch or come into contact with the used flossing material.

A flossing device is disclosed that includes a dispensing reel of flossing material and a collection reel that collects used flossing material, where the dispensing reel and the collection reel are contained within a cartridge that is inserted within the flossing device.

A flossing device is disclosed that includes a motorized assembly that provides for the motorized distribution, and collection of, flossing material.

A flossing device is disclosed that includes a motorized assembly that controls and advances the cartridges containing flossing material from the clean reel to the collection reel.

A flossing device is disclosed that provides for the distribution, and collection of, flossing material by a change of a position of the tines of the device.

BRIEF DESCRIPTION OF THE DRAWINGS

A complete understanding of the embodiments and the advantages and features thereof will be readily understood by reference to the following detailed description when considered in conjunction with the accompanying drawings wherein.

4

Figure 1:
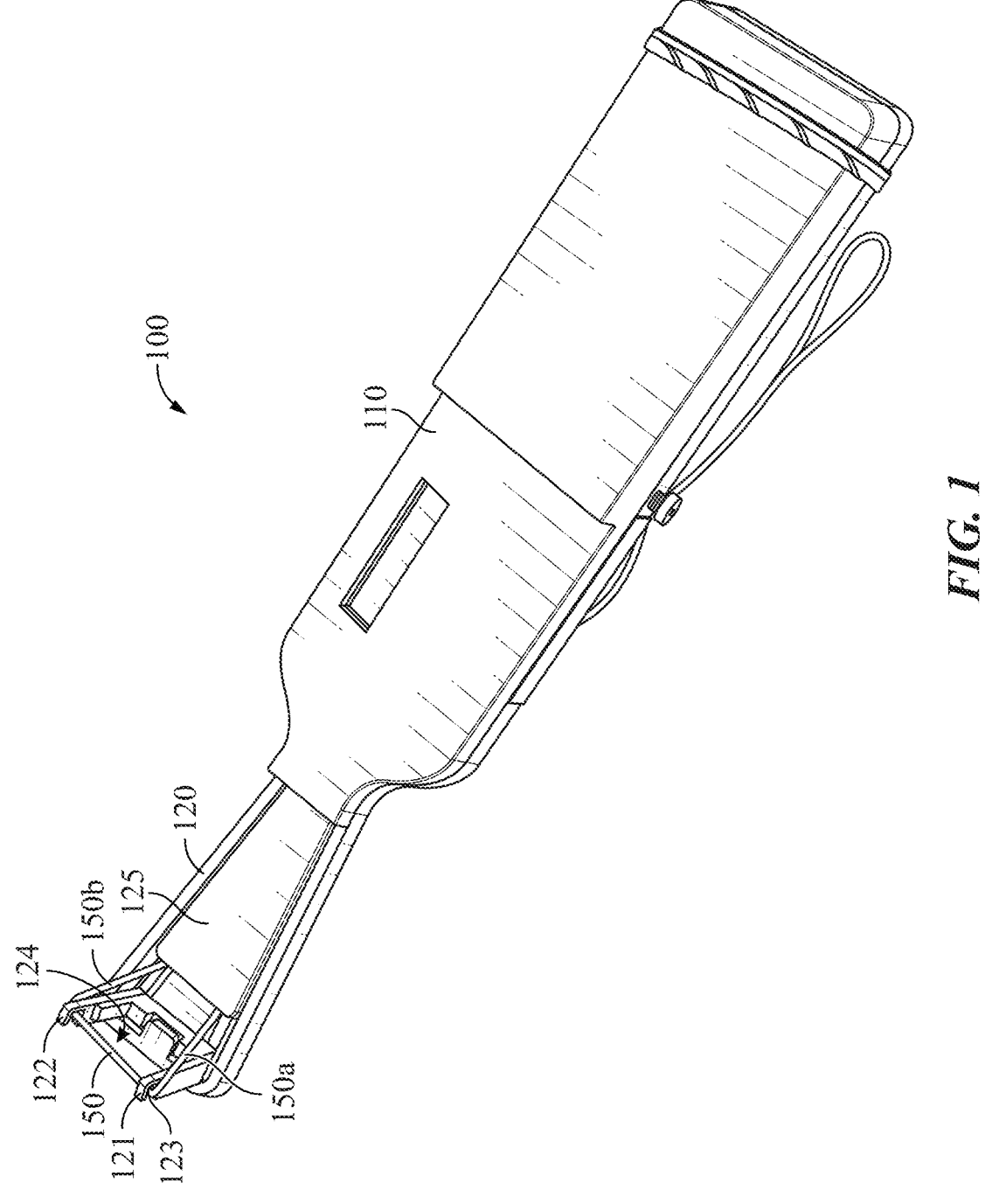
FIG. 1 illustrates a perspective view of a first exemplary embodiment of a flossing device in accordance with some embodiments disclosed herein.
Figure 2:
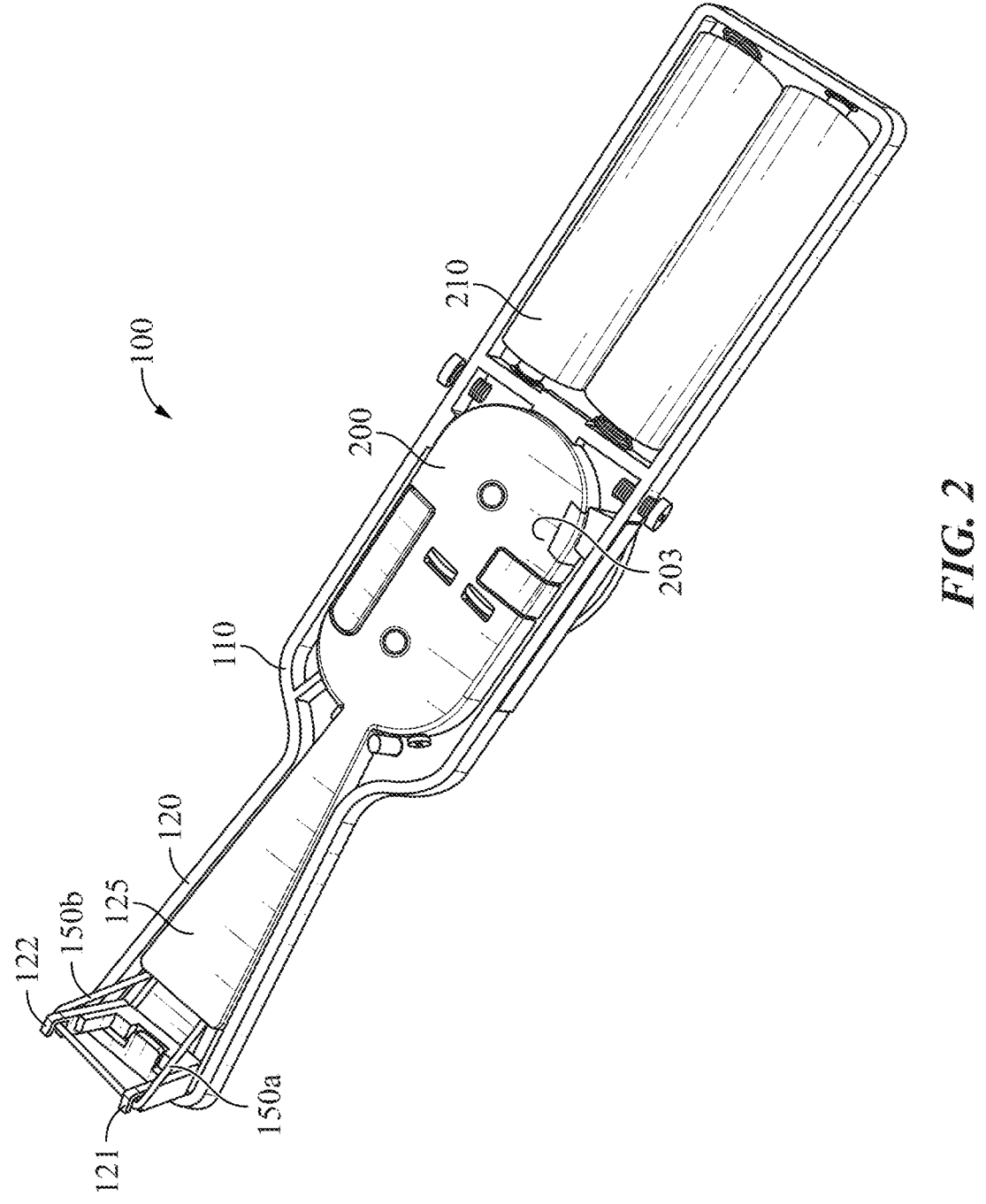

FIG. 2 illustrates a cutaway perspective view of the flossing device shown in FIG. 1.

Figures 3A, 3B:
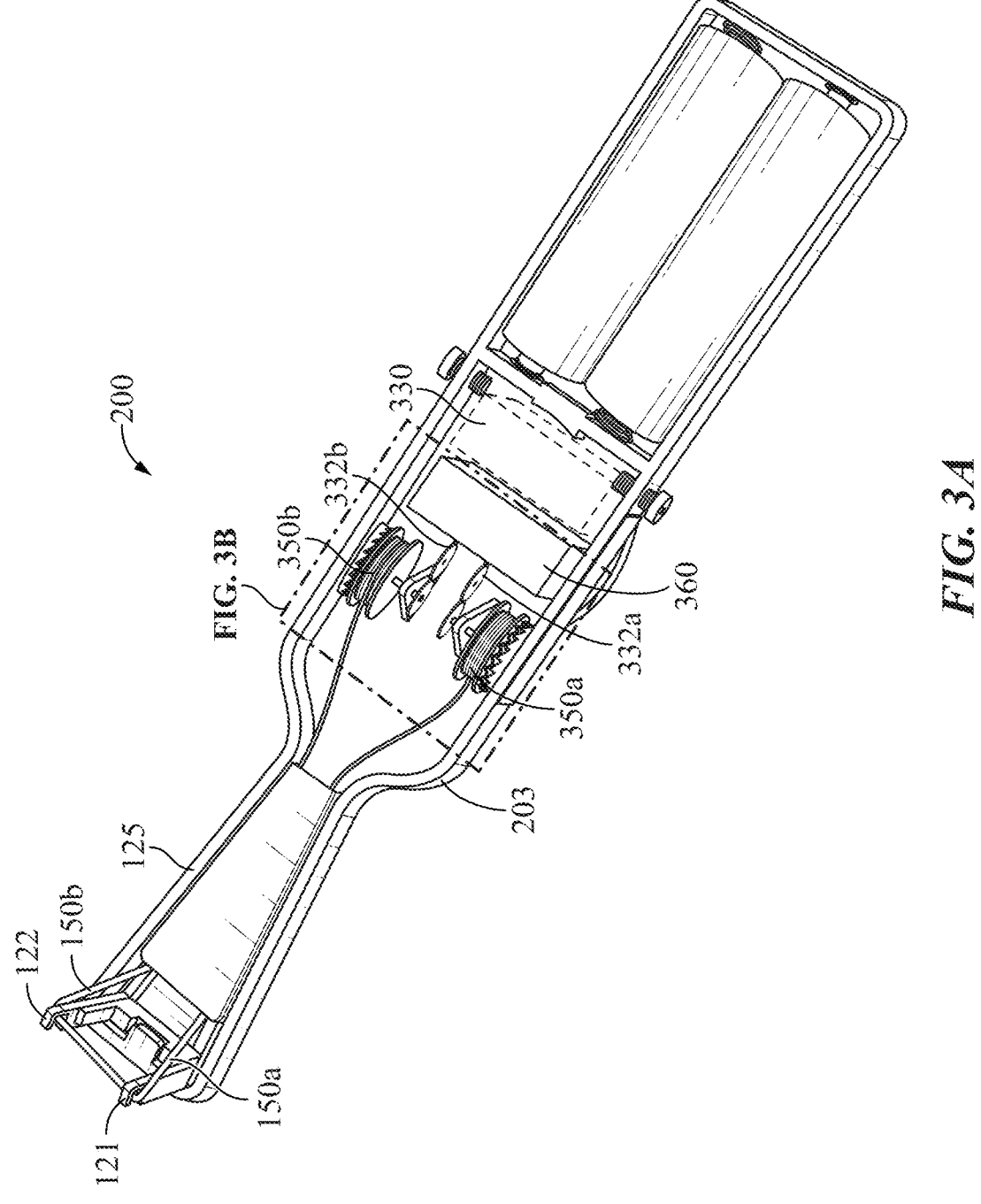
Figure 3B:
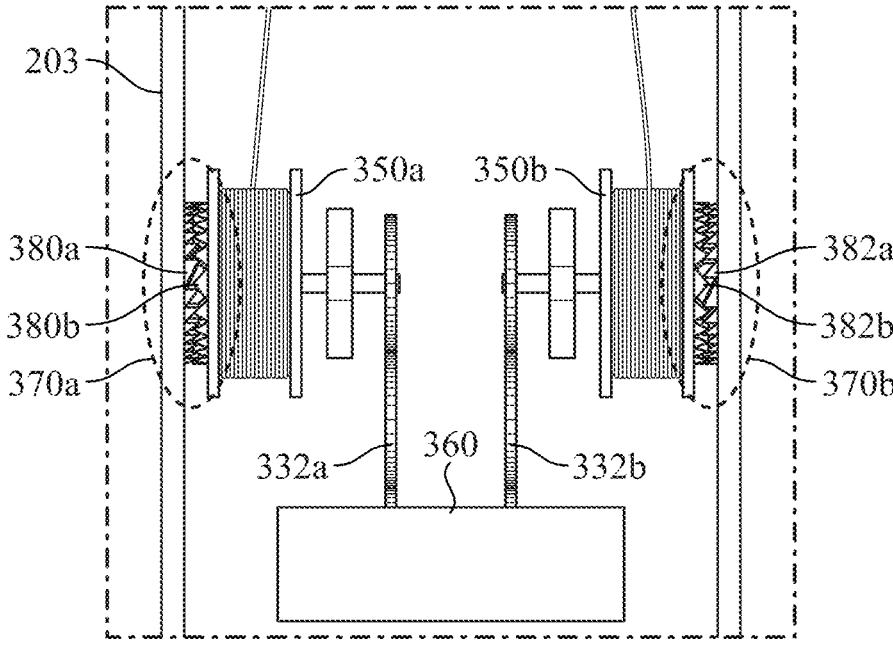

FIG. 3A illustrates a cutaway perspective view of an exemplary embodiment of flossing cartridge in accordance with some embodiments disclosed herein.

FIG. 3B illustrates an expanded view of the area identified as FIG. 3B in FIG. 3A.

Figures 4, 5:
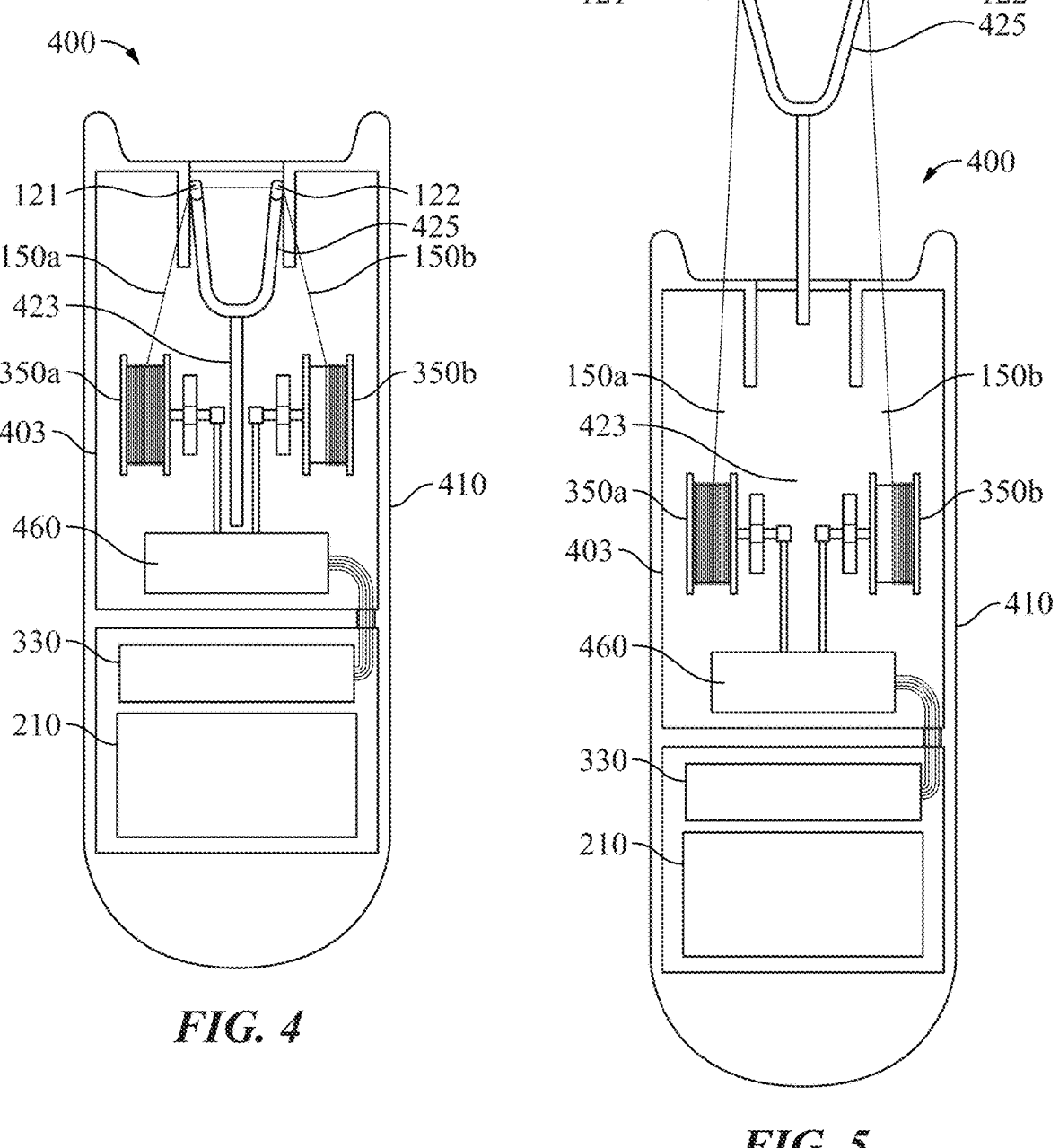

FIG. 4 illustrates a cutaway view of a first aspect of a second exemplary embodiment of a flossing device in accordance with some embodiments disclosed herein.

FIG. 5 illustrates a cutaway view of a second aspect of the second exemplary embodiment of the flossing device shown in FIG. 4.

DETAILED DESCRIPTION

The specific details of the single embodiment or variety of embodiments described herein are set forth in this application. Any specific details of the embodiments are used for demonstration purposes only, and no limitations, or inferences, as to the scope of the invention claimed are to be understood therefrom. It is noted that the embodiments reside primarily in combinations of components related to the system and method of use thereof.

The present embodiments are based in part on the ability to provide a cleaner and more sanitary means for improving the flossing experience.

FIG. 1 illustrates a perspective view of a first exemplary embodiment of a flossing device 100 in accordance with some embodiments disclosed herein.

Flossing device 100 comprises a body 110 and a neck 120 extending from the body 110. Further illustrated is tine assembly 125, extending from body 110, and being contained within neck 120. Included in tine assembly 125 are tines 121, 122 extending from the body 110, wherein the tines 121, 122 are used to retain flossing material 150 that includes a first portion of flossing material 150a and a second portion of flossing material 150b. In some embodiments, the tines 121, 122 retain the flossing material 150 taut during the flossing process. In this illustrated embodiment, the tines 121, 122, include passthroughs 123, 124, respectively, through which flossing material 150 passes. In some embodiments, the passthroughs 123, 124 can be throughholes. In some embodiments, the passthroughs 123, 124 can be U-shaped openings that allow for the retention of flossing material 150. Passthroughs 123, 124 allow for the slidable attachment of flossing material 150 to tines 121, 122.

FIG. 2 illustrates a cutaway perspective view of the flossing device shown in FIG. 1.

As illustrated body 110 contains, therein, a flossing cartridge 200 comprising a flossing cartridge body 203 and tine assembly 125 extending from cartridge body 203. Further illustrated is a power source 210 contained within body 110. Power source, in this illustrated embodiment, is represented as alkaline batteries. However, it would be recognized that power source 210 may comprise a rechargeable battery that may be recharged using, for example, a Universal Serial Port (USB, USB-c, etc.) source. In still another aspect, power source 210 may be an alternating current (AC) or direct current (DC) power source. In still another aspect, power source 210 may comprise an AC/DC converter that converts Alternating Current to a Direct Current. Furthermore, it would be recognized that a similar embodiment with a hand-cranked dial rather than an electronic power source could be used to advance the flossing material.

FIG. 3A illustrates a cutaway view of an exemplary embodiment of a cartridge assembly in accordance with some embodiments disclosed herein.

In this illustrated embodiment, cartridge 200 comprises body 203, tine assembly 125, and tines 121, 122, as previously discussed. Further illustrated are flossing material distribution reel 350a containing a supply of unused flossing material 150 and flossing material take-up reel 350b containing a supply of used flossing material 150. As shown, flossing material 150 extends from distribution reel 350a though the neck 120 and toward tine 121, from the tine 121 to the tine 122, and from the tine 122 through the neck 120 and toward take-up reel 350b. Controller 330 controls distribution reel 350a and take up reel 350b though a gearing system 332a, 332b, wherein distribution reel 350a is rotated in a first direction to remove flossing material 150 from reel 350a, while take-up reel 350b is rotated to collect flossing material 150. Distribution reel 350a and take up reel 350b may include a retaining assembly (e.g., 370a, 370b in FIG. 3B) that retains at least one of distribution reel 350a and take-up reel 350b in a fixed position after movement. The retaining assembly, by retaining at least one of reel 350a, 350b fixed, enables a tension to be maintained in the flossing material 150 extending between tines 121, 122.

In one aspect, a motor assembly 360 may be incorporated into cartridge body 203, wherein motor assembly 360 provides for the motorized movement of distribution reel 350a and take-up reel 350b. According to some embodiments, when cartridge 200 is placed within body 110, electrical contacts (not shown) on cartridge 200 may contact electrical contacts (not shown) within body 110 to enable power provided by power source 210 to be directed to motor assembly 360 and controller 330. Motor assembly 360 may comprise a DC motor that receives power from power source 210 and that is controlled by controller 330. In one aspect, controller 330 and motor assembly 360 may comprise, for example, a step-motor, wherein a predetermined number of "steps" or turns of the motor assembly may provide sufficient movement of reels 350a, 350b to collect used flossing material while distributing clean flossing material. Alternatively, controller 330 may comprise electronic circuitry that determines an amount of time that motor assembly 360 operates to turn reels 350a, 350b, wherein the amount of time allows for the collection of used flossing material while distributing clean, unused flossing material. In accordance with some embodiments, controller 330/ motor assembly 360 may drive or cause to move the distribution reel 350a and drive or cause to move the take-up reel 350b in either the same direction or in opposite directions as it moves the floss from the distribution reel 350a to the take-up reel 350b.

FIG. 3B illustrates an expanded view of the area identified as FIG. 3B in FIG. 3A.

In this illustrated view, retaining assembly 370a is shown in mechanical communication with distribution reel 350a and retaining assembly 370b is shown in mechanical communication with take-up reel 350b. In this exemplary embodiment of retaining assembly 370a, 370b, a plurality of first teeth 380a, 382a are connected to, or otherwise integrated with an inner surface of the cartridge body 203. Similarly, a plurality of second teeth 380b, 382b, are connected to, or otherwise integrated with reels 350a, 350b, respectively, facing first teeth 380a, 382a. In some embodiments, the first teeth 380a, 382a are constructed and arranged to engage with the second teeth 380b, 382b.

In accordance with some embodiments, the first teeth 380a, for example, of retaining assembly 370a may be configured in a saw-tooth pattern (i.e., right triangles) and second teeth 380b may be configured in a triangular pattern. In this configuration, distribution reel 350a may be constructed and arranged to advance in a first direction (e.g., upward direction). For example, the first teeth 380a can be constructed and arranged to allow the distribution reel 350a to advance in the first direction. The first teeth 380a can be constructed and arranged to prevent the distribution reel 350a from advancing in a second direction (e.g., downward direction) opposite the first direction. A similar, but reversed configuration, is shown with respect to retaining element 370b. In this case take-up reel 350b may advance in the second direction (e.g., downward direction) and is prevented from advancing in the first direction (e.g., upward direction).

FIG. 4 illustrates a cutaway view of a first aspect of a second exemplary embodiment of a flossing device in accordance with some embodiments disclosed herein.

In this illustrated second embodiment of flossing device 400, flossing device comprises body 410 into which are contained cartridge body 403, power source 210 and motor assembly 460. Power source 210 is similar to the power source 210 shown in FIG. 2 and a full understanding of the operation and componentry of power source 210 shown in FIG. 4 may be obtained from a reading of power source 210 shown in FIG. 2. Similarly, motor assembly 460 shown in FIG. 4 is comparable to the motor assembly 360 shown in FIG. 3A. In this illustrated embodiment motor assembly 460 is shown contained within body 410. However it would be recognized that motor assembly 460 may be incorporated into the cartridge body 403 in a manner similar to that shown in FIG. 3A.

Cartridge body 403 is similar to cartridge body 203, and contains a controller 330, a distribution reel 350a, and a take-up reel 350b, as previously disclosed. In addition, cartridge body 403 includes a tine assembly 425 comprising tines 121, 122 and an expandable arm 423. Flossing material 150 extends from distribution reel 350a, across tines 121, 122, and returns to take-up reel 350b. In this first aspect, tine assembly 425 is shown in a retracted position, wherein a space between tines 121, 122 is at a minimum.

FIG. 5 illustrates a cutaway view of a second aspect of the second exemplary embodiment of the flossing device shown in FIG. 4.

In this illustrated aspect, tine assembly 425 is extended from cartridge body 403 or contracted into cartridge body 403 through the operation of motor assembly 460. As tine assembly 425 extends from cartridge body 403, a spacing between tines 121, 122 increases. The increased spacing allows for tines 121, 122 to be place on either side of a tooth. Alternatively, as tine assembly 425 contracts into cartridge body 403 the space between tines 121, 122 decreases.

In accordance with some embodiments disclosed herein, as tine assembly 425 extends from cartridge 403, flossing material is released from distribution reel 350a and collected by take-up reel 350b. Similarly, retaining means 370 may be utilized to retain distribution reels and take-up reels in place.

In one aspect, the extension of tine assembly 425 may operate concurrently with the distribution and collection of flossing material 150. In another aspect, the distribution and collection of flossing material 150 may operate independently of the extension of tine assembly 425.

Although not shown, it would be recognized body 110 (FIG. 1) and body 410 (FIG. 4) may include at least one switch element (not shown) that may cause the activation of motor assembly 360, 460 to cause the distribution and collection of flossing material 150.

Many different embodiments have been disclosed herein, in connection with the above description. It will be understood that it would be unduly repetitious and obfuscating to literally describe every combination and subcombination of these embodiments. Accordingly, all embodiments can be combined in any way and/or combination, and the present specification, shall be construed to constitute a complete written description of all combinations and subcombinations of the embodiments described herein, and of the manner and process of making and using them, and shall support claims to any such combination or subcombination.

It will be appreciated by persons skilled in the art that the present embodiment is not limited to what has been particularly described hereinabove. A variety of modifications and variations are possible in light of the above teachings without departing from the following claims.

What is claimed is:

1. A dental flossing device comprising:
a housing;
a cartridge space; and
a power source;
a neck assembly extending from said housing,
a flossing cartridge removably insertable into said cartridge space, said flossing cartridge comprising:
   a cartridge housing comprising:
      a distribution reel configured to:
         contain a length of flossing material,
      a take-up reel configured to:
         collect said flossing material; and
      a cartridge neck assembly extending from said cartridge housing, said cartridge neck assembly comprising:
         a first tine; and
         a second tine spaced apart a known distance, wherein said flossing material extends through said cartridge neck assembly from said distribution reel toward said first tine and extends from said second tine toward said take-up reel;
      a motor assembly configured to:
         receive power from said power source; and
         cause movement of said distribution reel to distribute said flossing material and of said take-up reel to collect said flossing material.

2. The dental flossing device of claim 1, comprising: a switch to activate said motor assembly.

3. The dental flossing device of claim 1, comprising:
a retaining assembly associated with at least one of said distribution reel and said take-up reel, said retaining assembly configured to fix a position of a respective one of said distribution reel and said take-up reel.

4. The dental flossing device of claim 1, comprising: a controller configured to: control a movement of said distribution reel and said take-up reel.

5. The dental flossing device of claim 1, wherein said motor assembly comprises: a step motor.

6. A dental flossing device comprising:
a housing comprising:
a cartridge space,
a power source;
a flossing cartridge comprising:
   a cartridge housing comprising:
   a distribution reel containing a known length of flossing material, said distribution reel configured to:
      distribute said flossing material;
   a take-up reel configured to collect said flossing material,
   a tine assembly comprising:

8 a first tine; and
      a second tine, wherein said flossing material is held between said first tine and said second tine; and
   a motor assembly contained within said cartridge housing, said motor assembly configured to:
   receive power from said power source;
   extend said tine assembly; and
   cause movement of said distribution reel to distribute said flossing material and of said take-up reel to collect said flossing material; and wherein a spacing between said first tine and said second tine decreases as said tine assembly contracts into said cartridge housing.

7. The dental flossing device of claim 6, wherein a space between said first tine and said second tine increases as said tine assembly extends.

8. The dental flossing device of claim 6, comprising:
a retaining assembly associated with at least one of said distribution reel and said take-up reel, said retaining assembly configured to fix a position of a respective one of said distribution reel and said take-up reel.

9. The dental flossing device of claim 6, comprising:
a switch to activate said motor assembly.

10. A dental flossing cartridge comprising:
a housing containing therein:
   a distribution reel including a known length of flossing material, wherein said distribution reel is configured to:
   distribute said flossing material;
a take-up reel configured to:
   collect said flossing material, wherein said distribution reel and said take-up reel operate in the same or opposite directions;
a retaining assembly configured to: retain at least one of said distribution reel and said take-up reel in a desired position; and
a tine assembly comprising:
   a first tine; and
   a second tine, wherein said flossing material is slidably attachable to said first tine and said second tine; wherein said tine assembly is extendable from said housing and contractable into said housing; and
a motor assembly contained within said housing, said motor assembly configured to:
   cause movement of said distribution reel and said take-up reel; and
   extend said tine assembly from said housing and contract said tine assembly into said housing.

11. The dental flossing cartridge of claim 10, wherein said tine assembly is extended from said housing, and wherein a spacing between said first tine and said second tine increases as said tine assembly extends from said housing.

12. The dental flossing cartridge of claim 10, wherein a spacing between said first tine and said second tine increases as said tine assembly extends.

13. The dental flossing cartridge of claim 10, wherein a spacing between said first tine and said second tine decreases as said tine assembly contracts.

14. The dental flossing cartridge of claim 10, comprising: a controller configured to: control movement of said distribution reel and said take-up reel.

15. The dental flossing cartridge of claim 11, comprising: a controller configured to: control movement of said tine assembly.

16. The dental flossing cartridge of claim 10, comprising:
a motor assembly.

\*   \*   \*   \*   \*